(12) United States Patent
Fitzwater

(10) Patent No.: US 9,107,243 B2
(45) Date of Patent: Aug. 11, 2015

(54) ELEVATED MICROWAVE HEATING CONSTRUCT

(75) Inventor: Kelly R. Fitzwater, Lakewood, CO (US)

(73) Assignee: Graphic Packaging International, Inc., Atlanta, GA (US)

( * ) Notice: Subject to any disclaimer, the term of this patent is extended or adjusted under 35 U.S.C. 154(b) by 684 days.

(21) Appl. No.: 12/384,854

(22) Filed: Apr. 9, 2009

(65) Prior Publication Data

US 2009/0218338 A1 Sep. 3, 2009

Related U.S. Application Data

(63) Continuation of application No. PCT/US2007/081462, filed on Oct. 16, 2007.

(60) Provisional application No. 60/852,089, filed on Oct. 16, 2006.

(51) Int. Cl.
*H05B 6/80* (2006.01)
*B65D 81/34* (2006.01)
*H05B 6/64* (2006.01)
*A47J 36/02* (2006.01)

(52) U.S. Cl.
CPC .............. *H05B 6/6494* (2013.01); *A47J 36/027* (2013.01); *B65D 81/3453* (2013.01); *B65D 2205/02* (2013.01); *B65D 2581/3462* (2013.01); *B65D 2581/3472* (2013.01); *B65D 2581/3474* (2013.01); *B65D 2581/3477* (2013.01); *B65D 2581/3478* (2013.01); *B65D 2581/3479* (2013.01); *B65D 2581/3489* (2013.01); *B65D 2581/3497* (2013.01); *B65D 2581/3498* (2013.01)

(58) Field of Classification Search
CPC ........... B65D 81/3453; B65D 2205/00; B65D 2581/3403; B65D 2581/3472; B65D 2581/3489; B65D 2581/3494; Y10S 229/903
USPC ........ 219/730, 725, 732, 733, 735, 728, 759; 426/107, 109, 110, 111, 113, 234, 241, 426/243; 99/DIG. 14; 229/104
See application file for complete search history.

(56) References Cited

U.S. PATENT DOCUMENTS 1,513,608 A * 10/1924 Labombarde ................. 229/104
1,908,841 A    5/1933 Hawks
(Continued)

FOREIGN PATENT DOCUMENTS

EP    0 451 530 A    10/1991
EP    0 503 302 A2    9/1992
(Continued)

OTHER PUBLICATIONS

International Search Report—PCT/US2006/035503.
(Continued)

*Primary Examiner* — Quang Van
(74) *Attorney, Agent, or Firm* — Womble Carlyle Sandridge & Rice, LLP

(57) ABSTRACT

A construct for heating, browning, and/or crisping a food item in a microwave oven includes a platform having a first surface substantially defined by a microwave energy interactive element and a pair of side members joined to the platform along respective lines of disruption. The side members extend upwardly and downwardly from the plane of the platform.

28 Claims, 5 Drawing Sheets

(56) References Cited

U.S. PATENT DOCUMENTS

| | | | |
|---|---|---|---|
| 2,656,092 A | 10/1953 | Ellsworth | |
| 2,718,999 A | 9/1955 | Helmick | |
| 2,828,059 A * | 3/1958 | Ross | 229/104 |
| 3,346,399 A | 10/1967 | Watson et al. | |
| 3,368,734 A | 2/1968 | Wainberg | |
| 3,414,182 A | 12/1968 | Fobiano | |
| 3,425,543 A | 2/1969 | Harvey | |
| 3,865,301 A | 2/1975 | Pothier et al. | |
| 4,192,540 A | 3/1980 | Oliff | |
| 4,210,124 A | 7/1980 | Husslein et al. | |
| 4,279,374 A | 7/1981 | Webinger | |
| 4,505,391 A | 3/1985 | Kuchenbecker | |
| 4,567,341 A | 1/1986 | Brown | |
| 4,592,914 A | 6/1986 | Kuchenbecker | |
| 4,705,929 A | 11/1987 | Atkinson | |
| 4,775,771 A | 10/1988 | Pawlowski | |
| 4,785,160 A | 11/1988 | Hart | |
| 4,801,774 A | 1/1989 | Hart | |
| 4,826,072 A | 5/1989 | Hart | |
| 4,861,958 A | 8/1989 | Bohrer et al. | |
| 4,865,921 A | 9/1989 | Hollenberg | |
| 4,871,111 A | 10/1989 | Mode | |
| 4,877,932 A | 10/1989 | Bernstein et al. | |
| 4,890,439 A | 1/1990 | Smart | |
| 4,936,935 A | 6/1990 | Beckett | |
| 4,960,598 A * | 10/1990 | Swiontek | 426/107 |
| 4,963,240 A | 10/1990 | Fukasawa et al. | |
| 4,963,424 A | 10/1990 | Beckett | |
| 5,039,364 A | 8/1991 | Beckett | |
| 5,077,455 A | 12/1991 | Peleg et al. | |
| 5,114,034 A | 5/1992 | Miller et al. | |
| 5,117,078 A | 5/1992 | Beckett | |
| 5,144,107 A * | 9/1992 | Peleg | 219/730 |
| 5,153,402 A | 10/1992 | Quick et al. | |
| 5,213,902 A | 5/1993 | Beckett | |
| 5,221,419 A | 6/1993 | Beckett | |
| 5,247,149 A | 9/1993 | Peleg | |
| 5,253,800 A | 10/1993 | France | |
| 5,260,537 A | 11/1993 | Beckett | |
| 5,266,386 A | 11/1993 | Beckett | |
| 5,270,066 A | 12/1993 | Pawlowski | |
| RE34,683 E | 8/1994 | Maynard | |
| 5,340,436 A | 8/1994 | Beckett | |
| 5,354,973 A | 10/1994 | Beckett | |
| 5,357,086 A | 10/1994 | Turpin et al. | |
| 5,400,460 A * | 3/1995 | Roeker et al. | 15/230.12 |
| 5,410,135 A | 4/1995 | Pollart | |
| 5,424,517 A | 6/1995 | Habeger | |
| 5,519,195 A | 5/1996 | Keefer | |
| 5,544,806 A | 8/1996 | Anderson et al. | |
| 5,628,921 A | 5/1997 | Beckett | |
| 5,672,407 A | 9/1997 | Beckett | |
| 5,688,427 A | 11/1997 | Gallo, Jr. | |
| 5,759,418 A | 6/1998 | Frater et al. | |
| 5,759,422 A | 6/1998 | Schmelzer | |
| 5,800,724 A | 9/1998 | Habeger | |
| 5,948,308 A | 9/1999 | Wischusen | |
| 6,114,679 A | 9/2000 | Lai | |
| 6,150,646 A | 11/2000 | Lai et al. | |
| 6,204,492 B1 | 3/2001 | Zeng et al. | |
| 6,251,451 B1 | 6/2001 | Zeng | |
| 6,359,272 B1 | 3/2002 | Sadek et al. | |
| 6,414,290 B1 | 7/2002 | Cole | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,677,563 B2 | 1/2004 | Lai | |
| 6,717,121 B2 | 4/2004 | Zeng | |
| 6,765,182 B2 | 7/2004 | Cole | |
| 6,960,748 B2 | 11/2005 | Baker | |
| 7,081,286 B2 | 7/2006 | Benim et al. | |
| 8,217,325 B2 | 7/2012 | Russell | |
| 8,471,184 B2 | 6/2013 | Fitzwater | |
| 2004/0023000 A1 | 2/2004 | Young et al. | |
| 2004/0238534 A1 | 12/2004 | Mast | |
| 2005/0230383 A1 | 10/2005 | Romeo et al. | |
| 2006/0049190 A1 | 3/2006 | Middleton | |
| 2007/0056962 A1 | 3/2007 | Hopkins et al. | |
| 2007/0087090 A1 | 4/2007 | Russell et al. | |
| 2009/0230126 A1 | 9/2009 | Fitzwater | |
| 2012/0193351 A1 | 8/2012 | Russell | |

FOREIGN PATENT DOCUMENTS

| | | |
|---|---|---|
| EP | 10001243.4 | 4/2010 |
| EP | 12004826.9 | 9/2012 |
| FR | 745 013 A | 5/1933 |
| FR | 943 904 A | 3/1949 |
| FR | 961 269 A | 5/1950 |
| GB | 925 971 A | 5/1963 |
| GB | 2 127 677 A | 4/1984 |
| GB | 2 150 534 A | 7/1985 |
| WO | WO 93/19566 A | 9/1993 |
| WO | WO 2007/033183 | 3/2007 |
| WO | PCT/US2006/035503 | 12/2007 |
| WO | WO 2008/052096 | 5/2008 |
| WO | WO 2008/115272 | 9/2008 |
| WO | PCT/US2007/081462 | 4/2009 |
| WO | PCT/US2007/082477 | 4/2009 |

OTHER PUBLICATIONS

Written Opinion—PCT/US2006/035503.
International Search Report—PCT/US2007/081462.
Written Opinion—PCT/US2007/081462.
International Search Report—PCT/US2007/082477.
Written Opinion—PCT/US2007/082477.
European Search Report dated May 23, 2011 for EP 11 00 2391.
U.S. Appl. No. 12/384,855—Notice of Allowance dated Feb. 25, 2013.

* cited by examiner

ELEVATED MICROWAVE HEATING CONSTRUCT

CROSS-REFERENCE TO RELATED APPLICATIONS

This application is a continuation of International Application No. PCT/US07/081462, filed Oct. 16, 2007, which claims the benefit under 35 U.S.C. §119(e) of U.S. Provisional Application No. 60/852,089, filed Oct. 16, 2006, both of which are incorporated by reference herein in their entirety as though fully set forth herein.

TECHNICAL FIELD

The present invention relates to various blanks, constructs, and methods for heating, browning, and/or crisping a food item, and particularly relates to various blanks, constructs, and methods for heating, browning, and/or crisping a food item in a microwave oven.

BACKGROUND

Microwave ovens provide a convenient means for heating a variety of food items, including dough-based products such as pizzas, pies, and sandwiches. However, microwave ovens tend to cook such items unevenly and are unable to achieve the desired balance of thorough heating and a browned, crisp crust. Thus, there is a continuing need for a microwavable package that provides the desired degree of heating, browning, and crisping of the crust or dough of a food item.

SUMMARY

The present invention is directed generally to various blanks, constructs formed from such blanks, and methods of making such blanks and constructs. The various constructs of the invention generally include one or more features that may be used to elevate a food-bearing platform from the turntable and/or the interior floor of a microwave oven. By elevating the food item in this manner, more heat is retained by and/or directed to the food item, rather than being lost to the turntable or to the floor of the microwave oven. As a result, the microwave heating efficiency is improved significantly.

The various constructs of the invention may be erected readily from a flattened or collapsed configuration, thereby providing a convenient manner of packaging the construct with a food item.

In one aspect, a construct for supporting a food item in a microwave oven comprises a platform and a pair of side members joined to the platform along respective lines of disruption. The side members extend upwardly and downwardly from the platform. The portion of each side member extending upwardly may serve as a side wall for the platform, while the portion of each side member extending downwardly may serve as a support element for the platform.

In another aspect, a construct comprises a substantially planar platform that is capable of flexing somewhat to accommodate an outer surface of a food item, and a pair of substantially upstanding members joined to the platform. A first portion of each substantially upstanding member may extend upwardly from the platform and a second portion of each substantially upstanding member may extend downwardly from the platform. The substantially upstanding members generally may capable of being rotated along the respective lines of disruption.

In yet another aspect, a construct comprises a platform including an upper surface for receiving a food item, a pair of support elements extending downwardly from the platform, and a pair of side walls respectively extending upwardly from the support elements. The construct may include at least one venting aperture, for example, extending through the platform. The side walls may be adapted to rotate toward and away from the platform to accommodate the dimensions of the food item. The support elements generally elevate the platform and define an insulating void beneath the platform.

If desired, any of the various constructs may include one or more microwave energy interactive elements that further enhance the heating, browning, and/or crisping of the food item in a microwave oven. In some embodiments, the microwave energy interactive element comprises a susceptor, for example, a layer of aluminum having a thickness of less than about 100 angstroms. However, other microwave energy interactive elements and materials may be used.

Thus, for example, in one aspect, a construct comprises a platform having a first surface substantially defined by a microwave energy interactive element. The platform lies within or defines a substantially horizontal plane. A pair of side members is joined to the platform along respective lines of disruption, and extends upwardly and downwardly from, or above and below, the plane of the platform.

Each side member may include an outer panel that extends above the plane of the platform and below the plane of the platform and an inner panel that extends below the plane of the platform. The outer panel and the inner panel may be in a substantially contacting, facing relationship. In one variation, at least a portion of the outer panel extending above the plane of the platform forms an angle with the platform of from about 55° to about 125°. In another variation, at least a portion of the inner panel forms an angle with the platform of from about 55° to about 125°. However, other angles are contemplated.

The inner panel of each side member may be joined to the platform along the respective line of disruption, and each outer panel may be joined to each respective inner panel. The outer panel may be joined to the inner panel along a fold line, may be adhesively joined to the inner panel, or any combination thereof.

In another aspect, a construct for heating, browning, and/or crisping a food item in a microwave oven comprises a substantially planar platform and a pair of substantially upstanding members joined to opposed edges of the platform along respective lines of disruption. The platform has a first surface including a microwave energy interactive element. A first portion of each substantially upstanding member extends upwardly from the platform and a second portion of each substantially upstanding member extends downwardly from the platform. The substantially upstanding members are capable of being rotated along the respective lines of disruption. The platform may be capable of flexing to accommodate an outer surface of a food item.

In one variation, the portion of each substantially upstanding member extending upwardly from the platform at least partially defines a side wall for the platform. Each side wall may include an inwardly facing surface at least partially comprising a microwave energy interactive element, for example, a layer of metal that converts at least a portion of impinging microwave energy into thermal energy.

In another variation, the portion of each substantially upstanding member extending downwardly from the platform at least partially defines a support element for the platform. The support element may generally be adapted to elevate the platform from a surface on which the construct is seated.

In yet another variation, the portion of each substantially upstanding member extending downwardly from the platform includes a reinforcing panel. Each reinforcing panel may be substantially aligned with the respective opposed edge of the platform.

According to this aspect, when the first portion of each substantially upstanding member is rotated towards the platform, the second portion of each respective substantially upstanding member is rotated away from the platform. Conversely, when the first portion of each substantially upstanding member is rotated away from the platform, the second portion of each respective substantially upstanding member is rotated towards the platform. Rotation of the first portion of each substantially upstanding member is adapted to accommodate the outer surface of the food item seated on the platform. For example, a wider food item may require outward rotation of the first portion, while a narrower food item may require inward rotation of the first portion. Substantially complete rotation of the first portion of each substantially upstanding member towards the platform (or away from the platform) causes the construct to become substantially flattened. The construct can be provided to the user in this flattened or collapsed configuration and erected by rotating the respective first portions outwardly (or inwardly).

In yet another aspect, a construct for heating, browning, and/or crisping a food item in a microwave oven comprises a platform including an upper surface for receiving a food item, at least one venting aperture extending through the platform, a pair of support elements extending downwardly from opposed peripheral edges of the platform, and a pair of side walls extending upwardly from the respective support elements. The support elements elevate the platform and define an insulating void beneath the construct.

The construct also includes a microwave energy interactive material overlying at least a portion of the upper surface of the platform and at least a portion of an interior face of each side wall proximate the food item. The side walls are adapted to rotate toward and away from the platform to accommodate the dimensions of the food item and/or to bring the microwave energy interactive material into proximate and/or intimate contact with the surface of the food item. The support elements are adapted to rotate in concert with, but in the opposite direction from, the respective side walls. If desired, the platform also may be capable of flexing to bring the microwave energy interactive material on the upper surface into closer proximity with the surface of the food item.

In still another aspect, a construct for heating, browning, and/or crisping a food item in a microwave oven, comprises a plurality of panels, each having a first dimension extending in a first direction and a second dimension extending in a second direction substantially perpendicular to the first direction. The plurality of panels includes a main panel comprising a microwave energy interactive material, a pair of opposed minor panels respectively joined to the main panel along a first pair of opposed fold lines extending in the first direction, and a pair of opposed major panels respectively joined to the pair of opposed minor panels along a second pair of respective opposed fold lines extending in the first direction. The major panels are folded over the respective minor panels along the respective second pair of fold lines. The construct has a somewhat flattened configuration and may be erected into a construct for heating, browning, and/or crisping a food item in a microwave oven by rotating the major panels outwardly.

In one variation, the second dimension of each major panel is greater than the second dimension of each minor panel, such that a first portion of each major panel is in a substantially superposed, facing relationship with the respective minor panel, and a second portion of each major panel is in a substantially superposed, facing relationship with respective portions of the main panel.

In another variation, the first portion of each major panel is adhesively joined the respective minor panel to maintain the first portion of each major panel in the substantially superposed, facing relationship with the respective minor panel.

Other features, aspects, and embodiments will be apparent from the following description and accompanying figures.

BRIEF DESCRIPTION OF THE DRAWINGS

The description refers to the accompanying drawings, in which like reference characters refer to like parts throughout the several views, and in which.

DESCRIPTION

The present invention may be understood further by referring to the figures. For simplicity, like numerals may be used to describe like features. It will be understood that where a plurality of similar features are depicted, not all of such features necessarily are labeled on each FIGURE. It also will be understood that various components used to form the blanks and constructs of the present invention may be interchanged. Thus, while only certain combinations are illustrated herein, numerous other combinations and configurations are contemplated hereby.

Figure 1A:
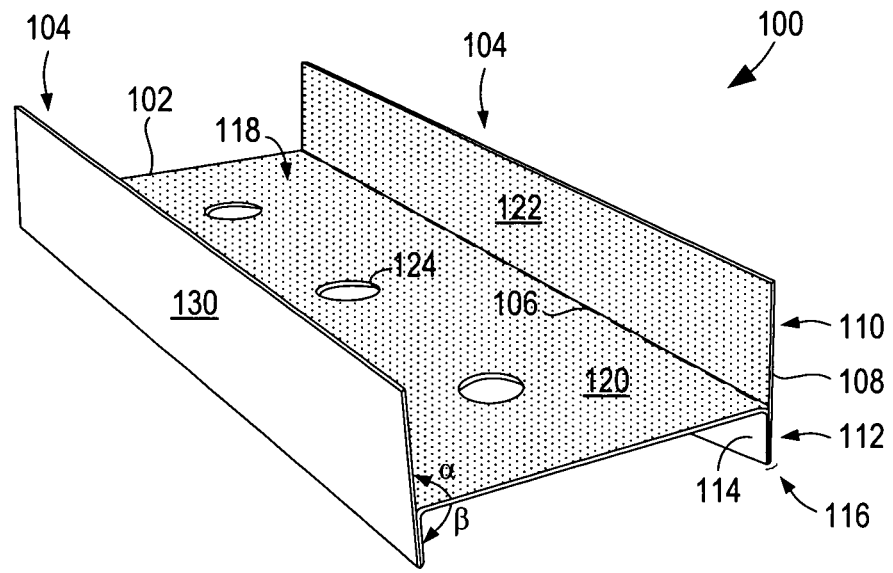
FIG. 1A is a schematic perspective view of an exemplary construct for heating, browning, and/or crisping a food item according to various aspects of the invention.
Figure 1B:
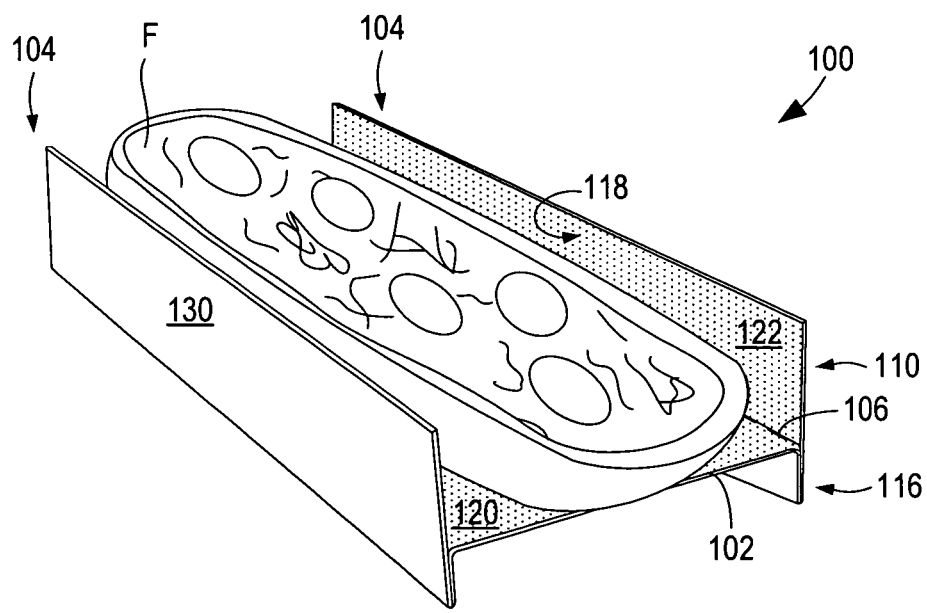
FIG. 1B is a schematic perspective view of the construct of FIG. 1A with a food item seated on the platform.

FIGS. 1A and 1B schematically depict a perspective view of an exemplary construct 100 (e.g., tray) for heating, browning, and/or crisping a food item F (FIG. 1B) according to various aspects of the invention. The construct 100 includes a main panel 102 that serves as a platform for supporting a food item F, as illustrated in FIG. 1B. The main panel 102 has a substantially planar construction, such that the elevated platform 102 can be said to lie within a substantially horizontal theoretical plane. However, it will be understood that depending on the material used to form the platform 102 and the particular food item F seated on the platform 102, the platform 102 may flex downwardly somewhat, for example, along the longitudinal centerline CL (FIG. 1C), or may otherwise bend or twist. Thus, it will be understood that the "plane of the platform 102" refers an approximation of the plane in which the platform generally lies and should not be bound by precise mathematical definitions, calculations, or measurements.

In this example, the main panel or platform 102 has a generally rectangular shape suitable, for example, for heating a French bread pizza or sandwich. However, it will be understood that numerous other suitable shapes and configurations may be used to form the platform 102. Examples of other shapes encompassed hereby include, but are not limited to, polygons, circles, ovals, or any other regular or irregular shape. The shape of the platform 102 may be determined by the shape of the food item, and it should be understood that different constructs are contemplated for different food items, for example, sandwiches, pizzas, French fries, soft pretzels, pizza bites, cheese sticks, pastries, doughs, and so forth. The platform 102 may be sized and shaped to receive one portion or multiple portions of one or more different food items.

Still viewing FIGS. 1A and 1B, the construct 100 includes a pair of opposed substantially upstanding side members 104 joined to the platform 102 along respective fold lines 106. Each upstanding member 104 comprises an outer panel or portion 108 that extends both upwardly from (i.e., above) the plane of the platform 102 and downwardly from (i.e., below) the plane of the platform 102.

The upwardly extending portion 110 of each outer panel 108 generally serves as a side wall for the platform 102, and therefore may be referred to as the wall portion 110 of the respective outer panel 108, or simply, the side wall 110 for the platform 102. The side wall 110 generally forms an angle α with respect to the plane of the platform 102, as indicated in FIG. 1A. Depending on the particular positioning of the respective upstanding member 104, the angle α may be less than 90°, such that the side wall 110 at least partially lies directly above the platform 102 (i.e., extends across the periphery or boundary defined by the peripheral edge of the platform 102), may be 90°, such that the side wall 110 is perpendicular to the plane of the platform 102, may be greater than 90°, such that the side wall 110 at least partially lies outside the periphery or boundary defined by the peripheral edge of the platform 102, or any combination thereof. It will be understood that the angle α may vary, depending on where it is measured along the length of the construct 100. In each of various particular examples, each angle α independently may be from about 45° to about 135°, from about 50° to about 130°, from about 55° to about 125°, from about 60° to about 120°, from about 65° to about 115°, from about 70° to about 110°, from about 80° to about 105°, from about 85° to about 100°, or about 90°. However, numerous other examples and configurations are contemplated by the invention.

The downwardly extending portion 112 of each outer panel 108 serves as a support element for the platform 102, and therefore may be referred to as the support portion 112 of the respective outer panel 108.

Each upstanding member 104 also may include a pair of opposed inner panels 114 substantially in face-to-face contact with and, optionally, at least partially joined, to the support portion 112 of the respective outer panel 108 to reinforce the support portion 112 and to provide additional support for the platform 102. In this example, the inner or reinforcing panels 114 have substantially the same dimensions as the support portion 112 of the respective outer panel 108. However, the panels and panel portions may differ in size if desired. The support portion 112 of each upstanding member 104 and the respective reinforcing panel 114 collectively serve as respective support members or elements 116 for the platform 102.

As shown in FIG. 1A, each support element 116 generally forms an angle β with respect to the plane of the platform 102, as measured between the reinforcing panel 114 and the platform 102. Depending on the positioning of the respective upstanding member 104, the angle β may be less than 90°, such that the support element 116 at least partially lies directly below the platform 102 (i.e., extends across the periphery or boundary defined by the peripheral edge of the platform 102), may be 90°, such that the support element 116 is perpendicular to the plane of the platform 102, may be greater than 90°, such that the support element 116 at least partially lies outside the periphery or boundary defined by the peripheral edge of the platform 102, or any combination thereof. It will be understood that the angle β may vary, depending on where it is measured along the length of the construct 100. In one particular example, the reinforcing panels 114 are aligned substantially with the peripheral edge of the platform 102 along the respective fold lines 106, such that the support elements 116 are substantially upright. In each of various other particular examples, the angle β independently may be from about 45° to about 135°, from about 50° to about 130°, from about 55° to about 125°, from about 60° to about 120°, from about 65° to about 115°, from about 70° to about 110°, from about 80° to about 105°, from about 85° to about 100°, or about 90°. However, numerous other examples and configurations are contemplated by the invention.

Optionally, a microwave energy interactive element 118 (shown schematically by stippling) may overlie, may be joined to, and/or may define at least a portion of a food-contacting side or surface 120 of the platform 102 and/or a food-contacting or interior side or surface 122 of one or both of the side walls 110. In one example, the microwave energy interactive element comprises a susceptor. However, other microwave energy interactive elements, such as those described below, are contemplated for use with the invention.

If desired, the construct 100 optionally may include one or more venting apertures 124 that allow water vapor or other gases to diffuse away from the food item F during heating. In this example, the construct 100 includes three apertures 124 substantially centrally aligned along the length of the platform 102. However, it will be understood that the number, shape, spacing, and positioning of the apertures may vary depending on the food item to be heated and the desired degree of browning and crisping, as will be discussed further below.

To use the construct 100 according to one exemplary method, a food item F may be placed on the main panel 102 between the wall portions 110 of the upstanding members 104 and placed into a microwave oven (not shown). The upstanding members 104 may flex and/or rotate inwardly or outwardly as needed to maximize contact between the food item F and the microwave energy interactive element 118 overlying and/or defining at least a portion of the interior surface 122 of walls 110. Likewise, the platform 102 may flex to accommodate the contours of the bottom of the food item, for example, a French bread pizza.

During heating, the food item F is maintained in this elevated position on the platform 102 by the support elements 116. The microwave energy interactive element 118, in this example, a susceptor, converts microwave energy to thermal energy to enhance the heating, browning, and/or crisping of the surface of the food item F, for example, the crust of a French bread pizza. The apertures 104 provide venting of steam that is generated during heating, thereby improving browning and/or crisping of the food item. Additionally, the air between the platform 102 and the floor of the microwave oven may provide an insulating effect, thereby decreasing the amount of heat loss from the microwave energy interactive material of the susceptor 118 to the floor of the microwave oven.

Figure 1C:
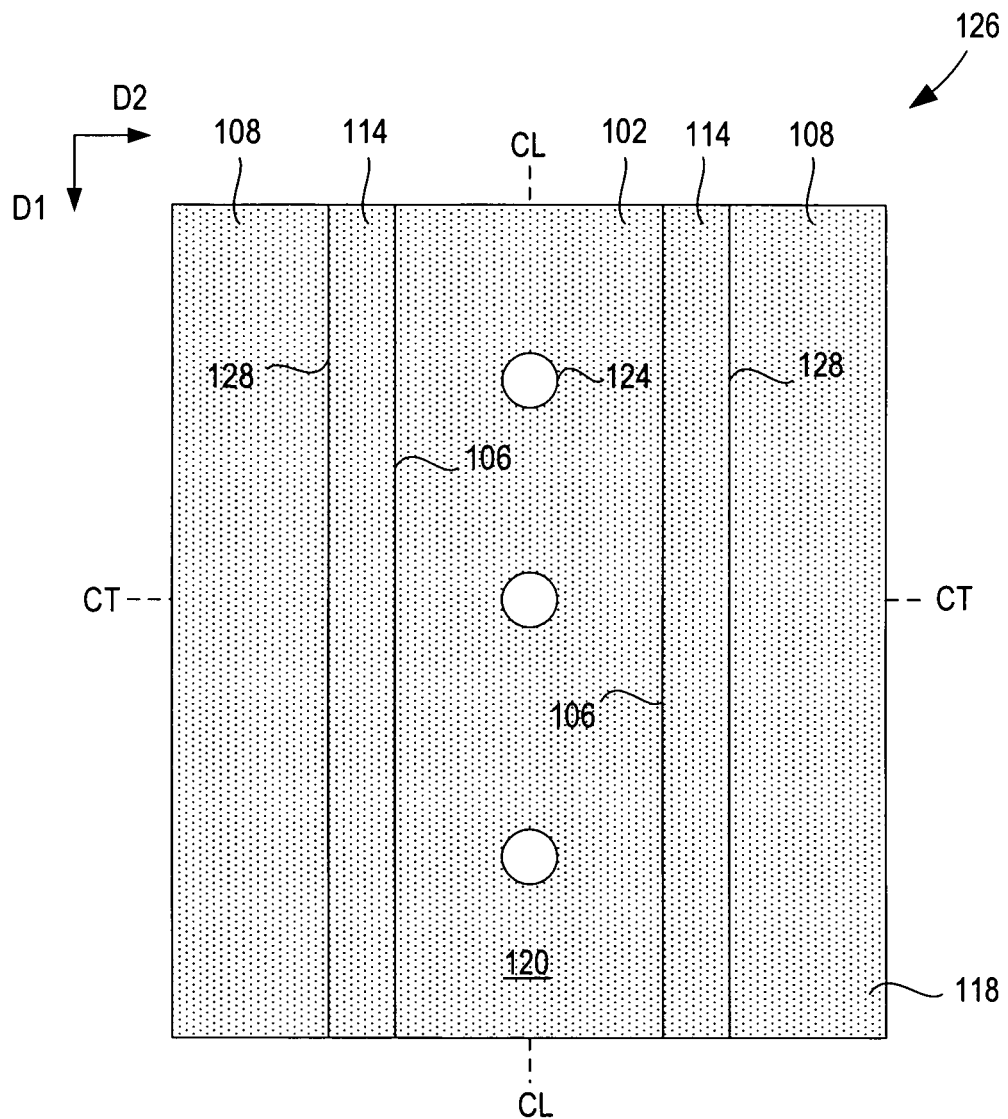
FIG. 1C is a schematic top plan view of an exemplary blank that may be used to form the construct of FIGS. 1A and 1B, according to various aspects of the invention.

FIG. 1C depicts a schematic top plan view of an exemplary blank 126 that may be used to form the construct 100 of FIGS. 1A and 1B. The blank 126 includes a plurality of panels joined along lines of disruption, for example, fold lines. The blank 126 and each of the various panels generally has a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the blank is manufactured or erected into the construct. The blank 126 may be symmetric or nearly symmetric about a transverse centerline CT and along a longitudinal centerline CL. Therefore, certain elements in the drawing figures may have similar or identical reference numerals to reflect the whole or partial symmetry.

Still viewing FIG. 1C, the blank 126 includes a generally rectangular food-bearing panel or main panel 102 that serves as the main panel or platform 102 of the construct 100 of FIGS. 1A and 1B. Minor panels 114 are joined to the main panel 102 along respective longitudinal fold lines 106. A major panel 108 is joined to each minor panel 114 along respective longitudinal fold lines 128. A microwave energy interactive element 118 (shown schematically by stippling) overlies at least a portion of the blank 126, and in this example, overlies substantially all of one side of the blank 126, to define at least a portion of a food contacting surface 120 of the construct 100 of FIGS. 1A and 1B. In this example, the microwave energy interactive element comprises a susceptor. However, other microwave energy interactive elements, such as those described herein, are contemplated for use with the invention. The opposite side or surface 130 of the blank 126 (hidden from view in FIG. 1C, best seen in FIGS. 1A, 1B, 1D, 1F, and 1G) also may include one or more microwave energy interactive elements if desired.

A plurality of venting apertures 124 extend through the main panel 102. In this example, three apertures 124 are positioned substantially along the longitudinal centerline CL of the blank 126. However, other numbers and arrangements of apertures are contemplated by the invention.

Figure 1D:
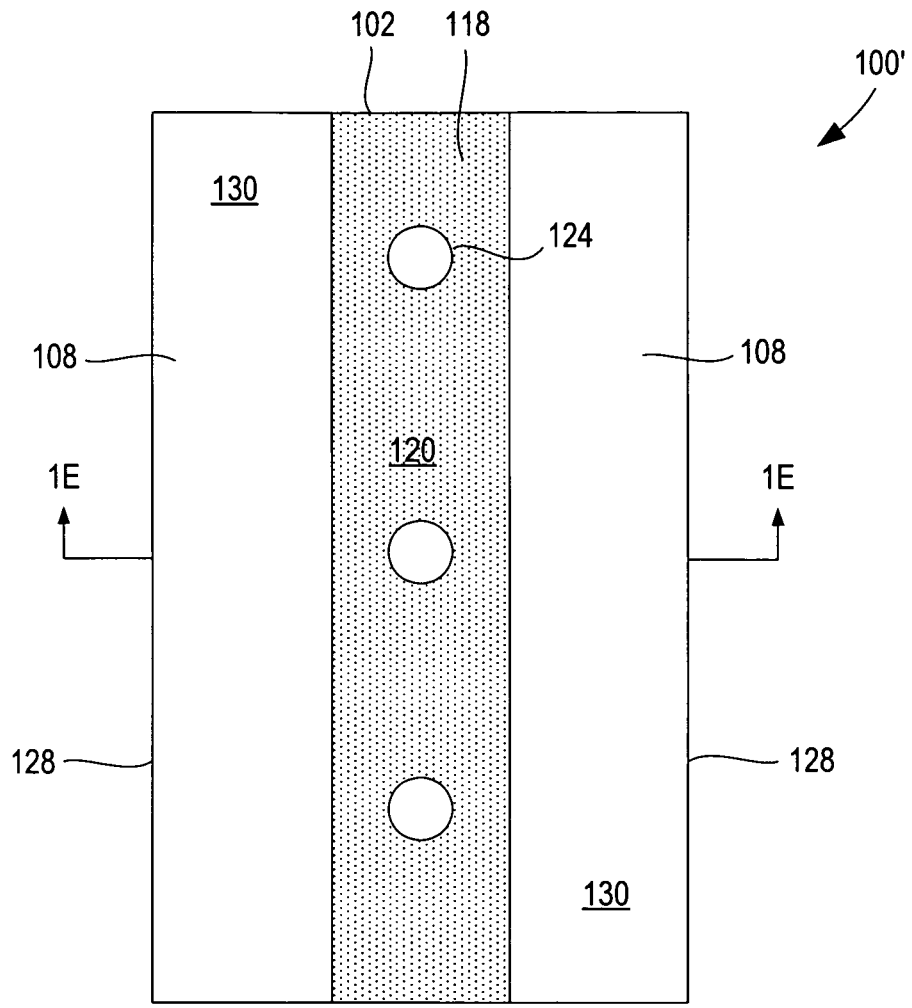
FIG. 1D is a schematic top plan view of an unerected construct formed from the blank of FIG. 1C, that may be erected into the construct of FIGS. 1A and 1B.
Figure 1E:
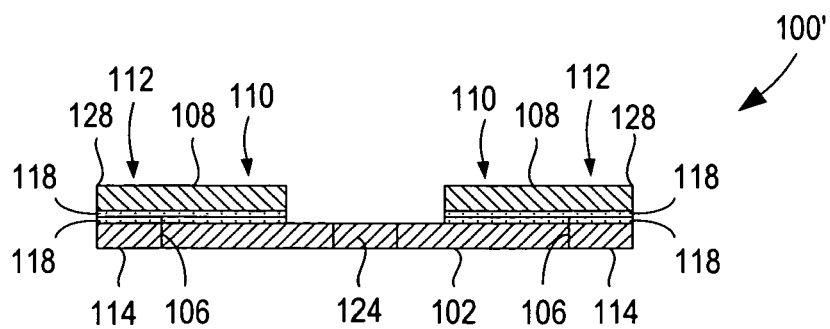
FIG. 1E is a schematic cross-sectional view of the construct of FIG. 1D, taken along a line 1E-1E.
Figure 1F:
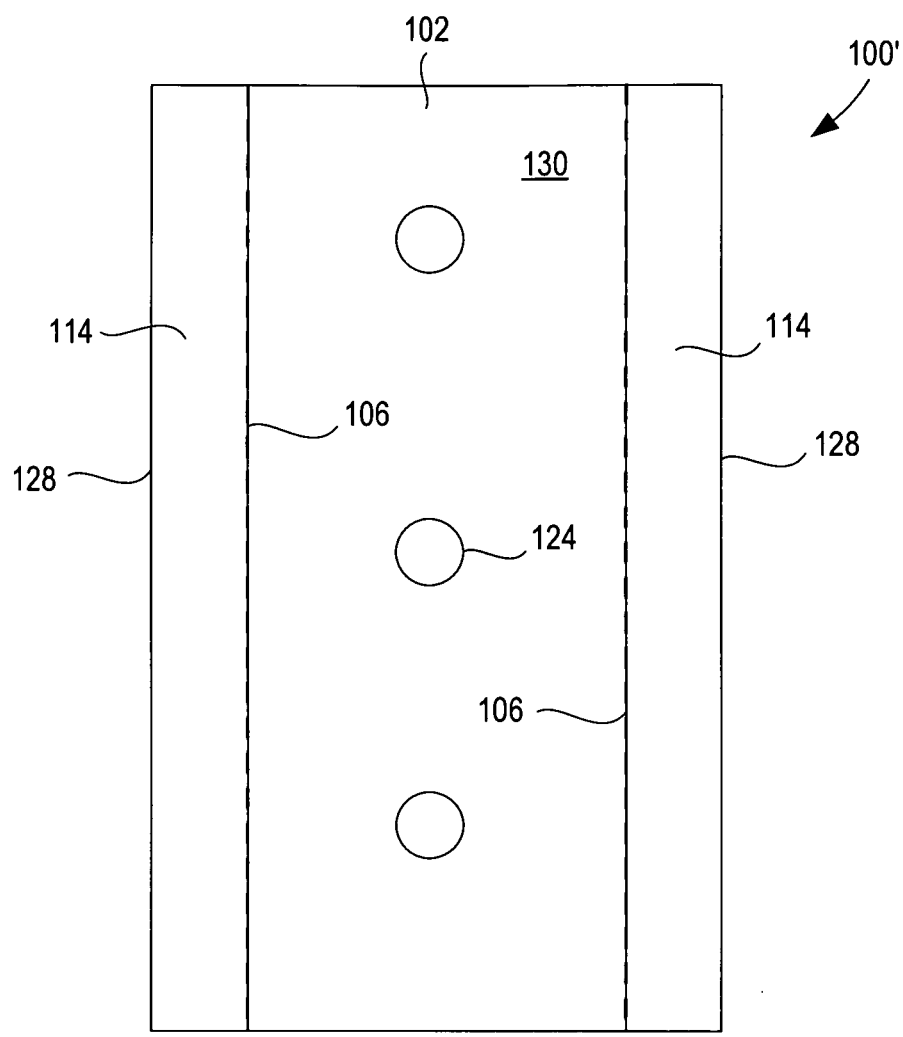
FIG. 1F is a schematic bottom plan view of the construct of FIG. 1C.

Turning to FIGS. 1D-1F, to transform the blank 126 into a flattened construct 100' according to one exemplary method, the major panels 108 of the blank 126 may be folded inwardly towards the main panel 102 along respective fold lines 128. When the major panels 108 are folded completely inwardly, a portion 110 of each major panel 108 is in a superposed face-to-face relationship with the main panel 102 and a portion 112 of each major panel is in a superposed facing relationship with the respective minor panel 114, thereby forming a flattened, erectable construct 100', as shown in FIG. 1D (top plan view), FIG. 1E (schematic cross-sectional view) and FIG. 1F (bottom plan view). The overlapped portions of panels 108 and 114 may be joined or affixed using glue or any other suitable adhesive material. Advantageously, the construct 100' can be provided to a user in this flattened configuration if desired and readily erected by the user when needed.

Figure 1G:
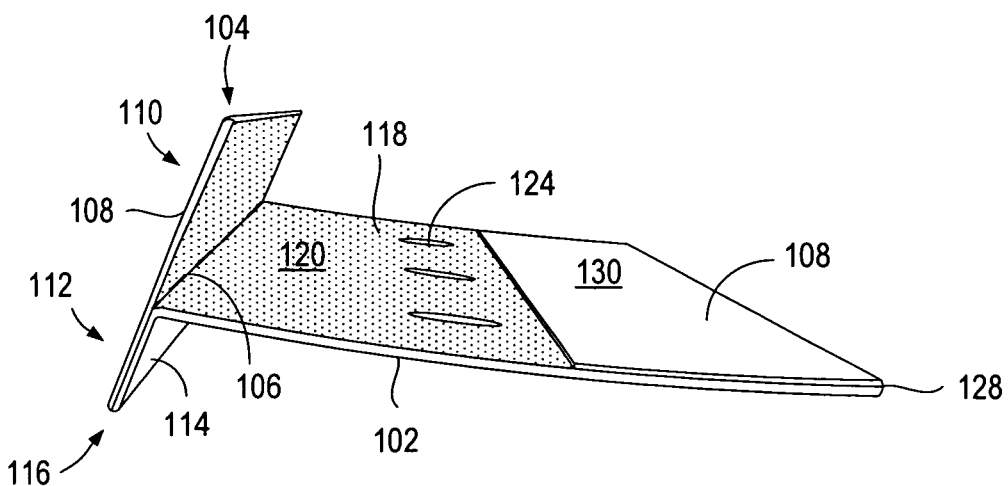
FIG. 1G is a schematic perspective view of the construct of FIGS. 1D-1F being erected into the construct of FIGS. 1A and 1B.

To erect the construct 100 according to one acceptable method, panels 108 may be folded outwardly away from the main panel 102, as illustrated schematically in FIG. 1G (in which only one panel 108 is folded outwardly). In doing so, the wall portions 110 are pivoted or hinged upwardly along fold line 106, and the support elements 116 (including support portion 112 and reinforcing panel 114) are pivoted downwardly along fold line 106. When both panels 108 are folded outwardly, the support elements 116 elevate the platform 102 from a surface (not shown) on which the construct is seated, as shown in FIGS. 1A and 1B.

It will be noted that by erecting the construct 100 from a flattened, folded construct 100' in this manner, panels 108 may generally seek or tend to remain directed inwardly, while the support elements 116 seek or tend to remain directed outwardly. Thus, an outwardly directed force must be exerted on panels 108 to erect the construct 100 and maintain the construct 100 in an erected configuration. As a result, panels 108 generally may exert a force on the food item F seated on the platform 102, thereby beneficially maintaining the panels 108 in proximate and/or intimate contact with the surface of the food item F, while the presence of the food item F prevents the construct 100 from returning to its flattened configuration.

Numerous materials may be suitable for use in forming the various blanks and constructs of the invention, provided that the materials are resistant to softening, scorching, combusting, or degrading at typical microwave oven heating temperatures, for example, from about 250° F. to about 425° F. The particular materials used may include microwave energy interactive materials and microwave energy transparent or inactive materials.

For example, any of the various blanks and/or constructs of the present invention may include one or more features that alter the effect of microwave energy during the heating or cooking of the food item. For instance, the construct may include one or more microwave energy interactive elements (hereinafter sometimes referred to as "microwave interactive elements") that promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular microwave heating construct and food item.

The microwave interactive element may be supported on a microwave inactive or transparent substrate for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such constructs may be referred to herein as "microwave interactive webs".

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymer film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric vehicle or other suitable matrix or binder, and may include flakes of an electroconductive metal, for example, aluminum.

In one example, the microwave interactive element may comprise a thin layer of microwave interactive material (generally less than about 100 angstroms in thickness, for example, from about 60 to about 100 angstroms in thickness) that tends to absorb at least a portion of impinging microwave energy and convert it to thermal energy (i.e., heat) at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor". In the example illustrated in FIG. 1C, a susceptor film 118 may overlie and be joined to at least a portion of any of panels 102, 108, 114. If desired, the susceptor film may overlie substantially all of the panels of the blank and may substantially define a first side or surface of the blank. However, other microwave energy interactive elements, such as those described herein, are contemplated hereby.

For example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

The shielding element may be formed from various materials and may have various configurations, depending on the particular application for which the shielding element is used. Typically, the shielding element is formed from a conductive, reflective metal or metal alloy, for example, aluminum, copper, or stainless steel, in the form of a solid "patch". The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil or high optical density evaporated material (collectively referred to as "segmented foil"), such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments often act as a transmitting element to direct microwave energy to specific areas of the food item. Such foils also may be used in combination with browning and/or crisping elements, for example, susceptors.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The number, shape, size, and positioning of such breaks or apertures may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void (e.g., venting apertures 124) in the material used to form the construct, or may be a non-physical "aperture". A non-physical aperture may be a portion of the construct that is microwave energy inactive by deactivation or otherwise, or one that is otherwise transparent to microwave energy. Thus, for example, the aperture may be a portion of the construct formed without a microwave energy active material or, alternatively, may be a portion of the construct formed with a microwave energy active material that has been deactivated. While both physical and non-physical apertures allow the food item to be heated directly by the microwave energy, a physical aperture also provides a venting function to allow steam or other vapors to be released from the food item.

In some instances, it may be beneficial to create one or more discontinuities or inactive regions to prevent overheating or charring of the construct. By way of example, and not limitation, in the construct 100 illustrated in FIGS. 1A and 1B, panel section 112 and reinforcing panel 114 are overlapped and in intimate and/or proximate contact with one another. When exposed to microwave energy, the concentration of heat generated by the overlapped panels may be sufficient to cause the underlying support, in this case, paperboard, to become scorched. As such, the overlapping portions of one or both of panel section 112 and the reinforcing panel 114 may be designed to be microwave energy transparent, for example, by forming these areas of the blank without a microwave energy interactive material, removing any microwave energy interactive material that has been applied, or by deactivating the microwave energy interactive material in these areas, as illustrated schematically by the non-stippled areas in FIG. 1H.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment.

As stated above, any of the above elements and numerous others contemplated hereby may be supported on a substrate. The substrate typically comprises an electrical insulator, for example, a polymer film or other polymeric material. As used herein, the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymer films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one example, the polymer film comprises polyethylene terephthalate (PET). Polyethylene terephthalate films are used in commercially available susceptors, for example, the QWIKWAVE® Focus susceptor and the MICRORITE® susceptor, both available from Graphic Packaging International (Marietta, Ga.). Examples of polyethylene terephthalate films that may be suitable for use as the substrate include, but are not limited to, MELINEX®, commercially available from DuPont Teijan Films (Hopewell, Va.), SKYROL, commercially available from SKC, Inc. (Covington, Ga.), and BARRIALOX PET, available from Toray Films (Front Royal, Va.), and QU50 High Barrier Coated PET, available from Toray Films (Front Royal, Va.).

The polymer film may be selected to impart various properties to the microwave interactive web, for example, printability, heat resistance, or any other property. As one particular example, the polymer film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, barrier polyethylene terephthalate, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, N.Y.). Additional examples include BARRIALOX PET, available from Toray Films (Front Royal, Va.) and QU50 High Barrier Coated PET, available from Toray Films (Front Royal, Va.), referred to above.

Still other barrier films include silicon oxide coated films, such as those available from Sheldahl Films (Northfield, Minn.). Thus, in one example, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 cc/m$^2$/day. In one aspect, the barrier film has an OTR of less than about 10 cc/m$^2$/day. In another aspect, the barrier film has an OTR of less than about 1 cc/m$^2$/day. In still another aspect, the barrier film has an OTR of less than about 0.5 cc/m$^2$/day. In yet another aspect, the barrier film has an OTR of less than about 0.1 cc/m$^2$/day.

The barrier film may have a water vapor transmission rate (WVTR) of less than about 100 g/m$^2$/day as measured using ASTM F1249. In one aspect, the barrier film has a WVTR of less than about 50 g/m$^2$/day. In another aspect, the barrier film has a WVTR of less than about 15 g/m$^2$/day. In yet another aspect, the barrier film has a WVTR of less than about 1 g/m$^2$/day. In still another aspect, the barrier film has a WVTR of less than about 0.1 g/m$^2$/day. In a still further aspect, the barrier film has a WVTR of less than about 0.05 g/m$^2$/day.

Other non-conducting substrate materials such as metal oxides, silicates, cellulosics, or any combination thereof, also may be used in accordance with the present invention.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683, each of which is incorporated by reference herein in its entirety. Although particular examples of patterns of microwave energy interactive material are shown and described herein, it should be understood that other patterns of microwave energy interactive material are contemplated by the present invention.

The microwave interactive element or microwave interactive web may be joined to or overlie a dimensionally stable, microwave energy transparent support (hereinafter referred to as "microwave transparent support", "microwave inactive support" or "support") to form the construct.

In one aspect, for example, where a rigid or semi-rigid construct is to be formed, all or a portion of the support may be formed at least partially from a paperboard material, which may be cut into a blank prior to use in the construct. For example, the support may be formed from paperboard having a basis weight of from about 60 to about 330 lbs/ream (lbs/3000 sq. ft.), for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

In another aspect, where a more flexible construct is to be formed, the support may comprise a paper or paper-based material generally having a basis weight of from about 15 to about 60 lbs/ream, for example, from about 20 to about 40 lbs/ream. In one particular example, the paper has a basis weight of about 25 lbs/ream.

Optionally, one or more portions of the various blanks or other constructs described herein or contemplated hereby may be coated with varnish, clay, or other materials, either alone or in combination. The coating may then be printed over with product advertising or other information or images. The blanks or other constructs also may be coated to protect any information printed thereon.

Furthermore, the blanks or other constructs may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, DuPont DARTEK™ nylon 6,6, and others referred to above.

Alternatively or additionally, any of the blanks or other constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. Patent Application Publication No. US 2006/0049190 A1, published Mar. 9, 2006, both of which are incorporated herein by reference in their entirety. Additionally, the blanks or other constructs may include graphics or indicia printed thereon.

It will be understood that with some combinations of elements and materials, the microwave interactive element may have a grey or silver color this is visually distinguishable from the substrate or the support. However, in some instances, it may be desirable to provide a web or construct having a uniform color and/or appearance. Such a web or construct may be more aesthetically pleasing to a consumer, particularly when the consumer is accustomed to packages or containers having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive element, using a dark toned substrate, for example, a black toned substrate, to conceal the presence of the silver or grey toned microwave interactive element, overprinting the metallized side of the web with a silver or grey toned ink to obscure the color variation, printing the non-metallized side of the web with a silver or grey ink or other concealing color in a suitable pattern or as a solid color layer to mask or conceal the presence of the microwave interactive element, or any other suitable technique or combination thereof.

Various aspects of the invention may be illustrated further by way of the following examples, which are not to be construed as limiting in any manner.

EXAMPLE

Figure 1H:
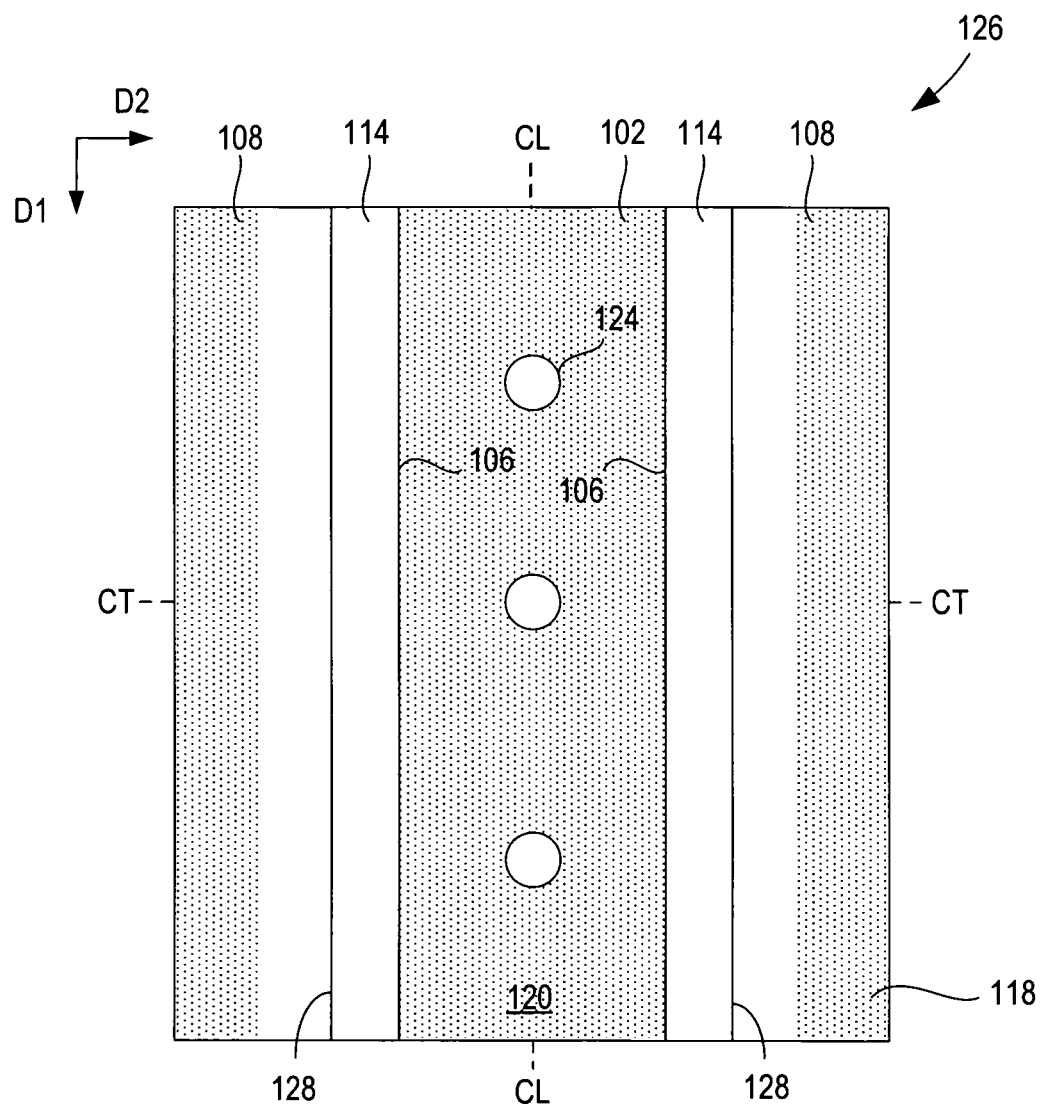
FIG. 1H is a schematic top plan view of another exemplary blank that may be used to form the construct of FIGS. 1A and 1B, with microwave energy transparent areas, according to various aspects of the invention.

Constructs for heating, browning, and crisping a food item similar to the construct of FIGS. 1A and 1B were formed using blanks similar to the blank of FIG. 1H. A commercially available French bread pizza was placed on the platform between the upwardly extending walls each construct, thereby causing the platform to curve downward slightly to conform to the bottom of the food item better. The sides of the French bread pizza were in proximate or intimate contact with the susceptor overlying the interior surface of the side walls. Each French bread pizza was heated in an 800 watt Panasonic microwave oven for about 2.5 minutes. Excellent heating, browning, and crisping of the French bread pizzas was obtained.

It will be understood that in each of the various blanks and constructs described herein and contemplated hereby, a "fold line" can be any substantially linear, although not necessarily straight, form of weakening that facilitates folding thereal ong. More specifically, but not for the purpose of narrowing the scope of the present invention, a fold line may be a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; or any combination of these features.

While various examples of constructs are provided herein, it will be understood that any configuration of components may be used as needed or desired. The construct may be flexible, semi-rigid, rigid, or may include a variety of components having different degrees of flexibility. Additionally, it should be understood that the present invention contemplates constructs for single-serving portions and for multiple-serving portions. It also should be understood that various components used to form the constructs of the present invention may be interchanged. Thus, while only certain combinations are illustrated herein, numerous other combinations and configurations are contemplated hereby.

Although certain embodiments of this invention have been described with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, Joinder references do not necessarily imply that two elements are connected directly and in fixed relation to each other.

It will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

It is intended that all matter contained in the above description or shown in the accompanying drawings shall be interpreted as illustrative only and not limiting. For example, various elements discussed with reference to the various embodiments may be interchanged to create entirely new embodiments coming within the scope of the present invention. Furthermore, changes in detail or structure may be made without departing from the spirit of the invention. Thus, the detailed description set forth herein is not intended nor is to be construed to limit the present invention or otherwise to exclude any such other embodiments, adaptations, variations, modifications, and equivalent arrangements of the present invention. Rather, the description is only illustrative and exemplary of the present invention and is made merely for purposes of providing a full and enabling disclosure of the present invention and to provide the best mode contemplated by the inventor or inventors of carrying out the invention.

Thus, while the present invention has been discussed above with reference to exemplary embodiments, various additions, modifications and changes can be made thereto without departing from the spirit and scope of the invention as set forth in the following claims.

What is claimed is:

1. A microwave heating construct for preparing a food item, the food item having a surface that is desirably browned and/or crisped, the microwave heating construct comprising:
    a platform comprising microwave energy interactive material, the microwave energy interactive material being operative for converting at least a portion of impinging microwave energy into thermal energy; and
    a pair of side members pivotably joined to the platform, the side members each comprising an inner panel and an outer panel, wherein
        the outer panel includes a first portion and a second portion, the inner panel and the first portion of the outer panel including microwave energy interactive material, and
        the inner panel is joined to the first portion of the outer panel so that the inner panel and the first portion of the outer panel are fixedly coupled to one another in a facing, substantially parallel relationship,
    wherein
        in an unerected configuration, the inner panel is substantially coplanar with the platform, and the second portion of the outer panel is in a facing, contacting relationship with the platform so that the microwave heating construct in the unerected configuration is substantially planar, and
        in an erected configuration,
            the second portion of each outer panel is pivoted away from the platform, and the inner panels and the first portion of each outer panel are pivoted inwardly towards the platform, so that the first portion of the outer panels extend below the platform and the second portion of the outer panels extend above the platform, and
            the platform is for having the food item positioned thereon with the surface of the food item being in a facing relationship with the microwave energy interactive material of at least the platform, and the second portion of each outer panel is for engaging the food item so that the food item arrests pivoting of the side members and maintains the construct in the erected configuration.

2. The construct of claim 1, wherein in the erected configuration, the second portion of each outer panel forms an angle of from about 55° to about 125° with respect to the platform, and the inner panels each form an angle of from about 55° to about 125° with respect to the platform.

3. The construct of claim 1, wherein
    the second portion of each outer panel includes microwave energy interactive material, the microwave energy interactive material being operative for converting at least a portion of impinging microwave energy into thermal energy, and
    the second portion of each outer panel engaging the food item maintains the microwave energy interactive material of the second portion of each outer panel in close proximity with the food item.

4. The construct of claim 1, wherein
    the second portion of each outer panel includes microwave energy interactive material, the microwave energy interactive material being operative for converting at least a portion of impinging microwave energy into thermal energy, and
    the platform having the food item positioned thereon urges the platform downwardly so that the microwave energy interactive material of the second portion of each outer panel is brought into close proximity with the food item.

5. The construct of claim 1, wherein the microwave energy interactive material has a thickness of less than about 100 angstroms.

6. The construct of claim 1, wherein the microwave energy interactive material is selected from the group consisting of aluminum, indium tin oxide, and any combination thereof.

7. The construct of claim 1, wherein, for each side member of the pair of side members, the first portion of the outer panel is foldably connected to the inner panel along a fold line.

8. The construct of claim 1, wherein, for each side member of the pair of side members, the inner panel is an innermost panel of the side member and the outer panel is an outermost panel of the side member.

9. The construct of claim 1, wherein the microwave energy interactive material of at least one of the inner panel and the first portion of the outer panel in each of the side members is at least partially deactivated.

10. A microwave heating construct for preparing a food item, the food item having bottom and side surfaces that are desirably browned and/or crisped, the microwave heating construct comprising:
    a main panel, and
    a pair of side members joined to the main panel along fold lines, wherein the side members each include a minor panel and a major panel, wherein the major panel includes a first portion and a second portion, the first portion being fixedly coupled to the minor panel, wherein the main panel and the second portion of the major panels each comprise microwave energy interactive material operative for converting microwave energy into thermal energy and the minor panels and the first portion of the major panels each comprise microwave energy interactive material,
    wherein
        in an unerected configuration, the minor panels are substantially coplanar with the main panel, the first portion of the major panel and the minor panel are in a substantially superposed, facing relationship with one another, and the second portion is in a substantially superposed, facing relationship with the main panel, so that the microwave heating construct in the unerected configuration is substantially planar, and
        in an erected configuration,
            the side members are pivoted along the fold lines so that the minor panels and major panels are brought into a substantially upright configuration so that the minor panels and the first portion of each major panel elevate the main panel, and
            the food item is positioned on the main panel so that the bottom and side surfaces of the food item are in a facing relationship with the microwave energy interactive material of the main panel and the second portion of each major panel, and
            the second portion of each major panel engages the food item so that the pivoting of the minor panels and the first portion of each major panel towards the main panel is arrested and the microwave heating construct is maintained in the erected configuration.

11. The construct of claim 10, wherein pivoting the side members along the fold lines so that the minor panels and major panels are brought into the substantially upright configuration comprises concurrently pivoting the second portion of each major panel away from the main panel and pivoting the minor panels and the first portion of each major panel towards the main panel.

12. The construct of claim 10, wherein in the erected configuration, the second portion of each major panel forms an angle of from about 55° to about 125° with respect to the main panel, and the minor panels each form an angle of from about 55° to about 125° with respect to the main panel.

13. The construct of claim 10, wherein the second portion of each major panel engaging the food item maintains the microwave energy interactive material of the second portion of each major panel in close proximity with the food item.

14. The construct of claim 10, wherein the food item positioned on the main panel urges the main panel downwardly so that the microwave energy interactive material of the second portion of each major panel is maintained in close proximity with the food item.

15. The construct of claim 10, wherein the microwave energy interactive material has a thickness of less than about 100 angstroms.

16. The construct of claim 10, wherein the microwave energy interactive material is selected from the group consisting of aluminum, indium tin oxide, and any combination thereof.

17. The construct of claim 10, wherein, for each side member of the pair of side members, the first portion of the major panel is foldably connected to the minor panel along a fold line, and the first portion of the major panel is in face-to-face contact with the minor panel.

18. The construct of claim 10, wherein, for each side member of the pair of side members, the minor panel is an innermost panel of the side member and the major panel is an outermost panel of the side member.

19. The construct of claim 10, wherein the microwave energy interactive material of at least one of the minor panel and the first portion of the major panel in each of the side members is at least partially deactivated.

20. A construct for preparing a food item in a microwave oven, the food item having a surface that is desirably browned and/or crisped, the microwave heating construct comprising:
a main panel for receiving the food item, the main panel including microwave energy interactive material operative for generating heat from microwave energy,
a pair of reinforcing panels including a first reinforcing panel and a second reinforcing panel joined to opposite edges of the main panel, wherein each of the first reinforcing panel and the second reinforcing panel includes microwave energy interactive material, and
a first side panel and a second side panel, each of the first side panel and the second side panel including a first portion and a second portion, wherein the first portion includes microwave energy interactive material and the second portion includes microwave energy interactive material operative for generating heat from microwave energy,
wherein the first portion of the first side panel is coupled to the first reinforcing panel in a facing, substantially parallel relationship so that the first portion of the first side panel and the first reinforcing panel have a fixed position with respect to one another, and the first portion of the second side panel is coupled to the second reinforcing panel in a facing, substantially parallel relationship so that the first portion of the second side panel and the second reinforcing panel have a fixed position with respect to one another,
wherein in an unerected configuration, the second portion of the first side panel and the second portion of the second side panel are in a facing, contacting relationship with the main panel, and
wherein in the erected configuration,
the reinforcing panels and each side panel are moved into a substantially upright configuration so that the reinforcing panels and the first portion of each side panel extend downwardly from the main panel to define a void beneath the main panel, and the second portion of each of the first side panel and the second side panel extends upwardly from the main panel to define side walls for the main panel, and
the food item is positioned on the main panel so that
the surface of the food item is in a facing relationship with the microwave energy interactive material of the main panel and the second portion of the respective first and second side panels, and
the second portion of each of the first side panel and the second side panel engages the food item so that the pivoting of the reinforcing panel and the first portion of each of the first side panel and the second side panel towards the main panel is arrested and the microwave heating construct is maintained in the erected configuration.

21. The construct of claim 20, wherein the reinforcing panels and each side panel are moved into a substantially upright configuration by concurrently pivoting
the second portion of each side panel away from the main panel, and
the reinforcing panel and the first portion of each side panel towards the main panel.

22. The construct of claim 20, wherein in the erected configuration, the second portion of each side panel forms an angle of from about 55° to about 125° with respect to the main panel, and the reinforcing panels each form an angle of from about 55° to about 125° with respect to the main panel.

23. The construct of claim 20, wherein in the erected configuration, the second portion of each side panel engaging the food item maintains the microwave energy interactive material of the second portion of each side panel in close proximity with the food item.

24. The construct of claim 20, wherein the food item positioned on the main panel urges the main panel downwardly so that the microwave energy interactive material of the second portion of each side panel is maintained in close proximity with the food item.

25. The construct of claim 20, wherein the microwave energy interactive material has a thickness of less than about 100 angstroms.

26. The construct of claim 20, wherein the microwave energy interactive material comprises at least one of aluminum and indium tin oxide.

27. The construct of claim 20, wherein the first portion of the first side panel is foldably connected to the first reinforcing panel along a first fold line, and the first portion of the second side panel is foldably connected to the second reinforcing panel along a second fold line.

28. The construct of claim 20, wherein the microwave energy interactive material of at least one of the first reinforcing panel, the second reinforcing panel, the first portion of the first side panel, and the first portion of the second side panel is at least partially deactivated.

* * * * *